UNITED STATES PATENT OFFICE.

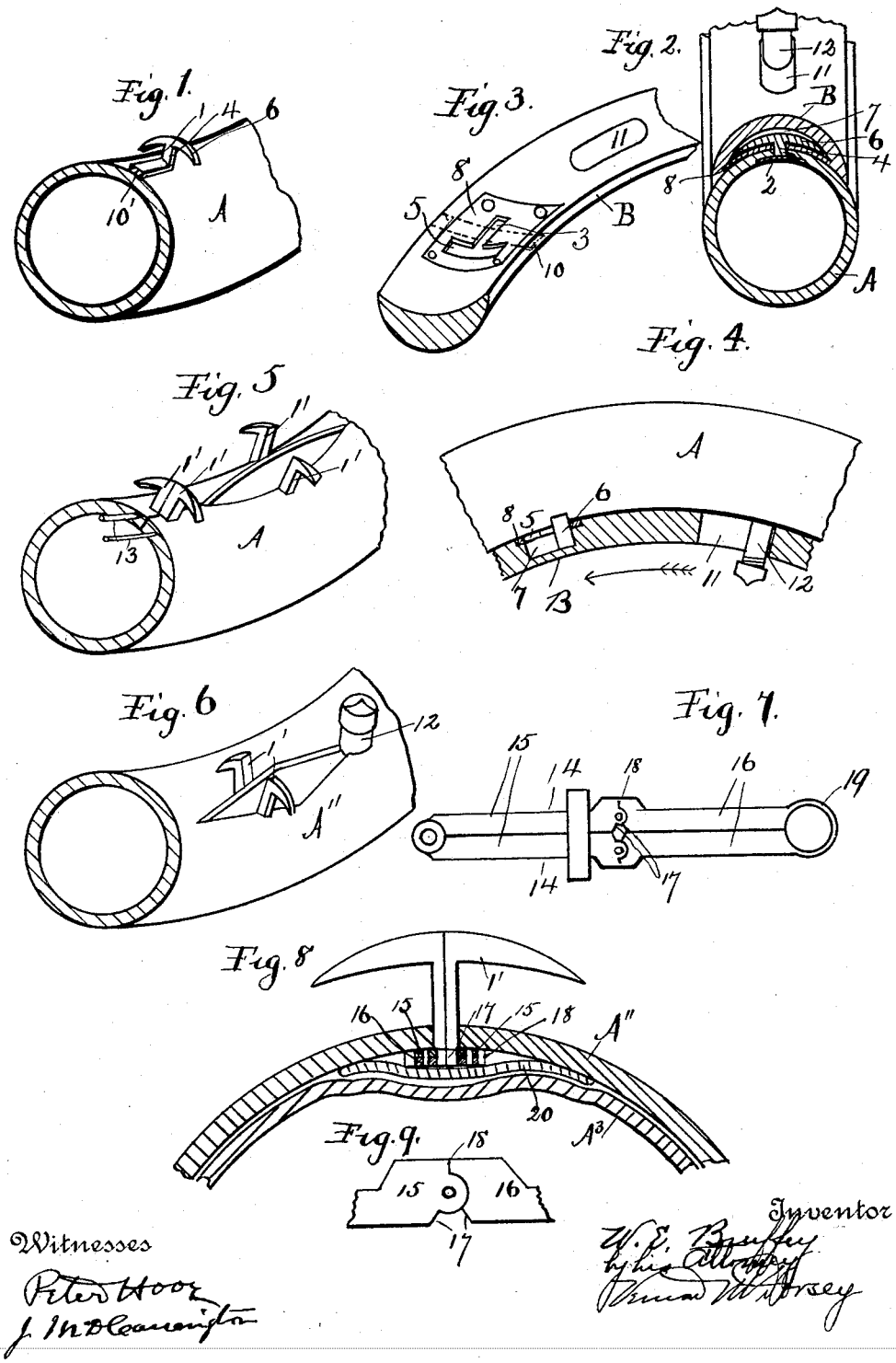

WILLIAM E. BRUFFEY, OF SPRINGDALE, ARKANSAS.

TIRE AND MEANS FOR SECURING SAME IN PLACE.

SPECIFICATION forming part of Letters Patent No. 596,475, dated January 4, 1898.

Application filed August 20, 1897. Serial No. 648,895. (No model.)

*To all whom it may concern:*

Be it known that I, WILLIAM E. BRUFFEY, a citizen of the United States, residing at Springdale, in the county of Washington and State of Arkansas, have invented certain new and useful Improvements in Tires and Means for Securing the Same in Place; and I do hereby declare the following to be a full, clear, and exact description of the invention, such as will enable others skilled in the art to which it appertains to make and use the same.

My invention in its broadest aspect is applicable generally to securing tires upon the rims of vehicle-wheels; but I have also invented and hereinafter describe and claim an invention which is particularly applicable to double-tube pneumatic tires, such as are used upon bicycles and other vehicles.

My invention therefore may be said to consist, first, in suitable headed projections upon a tire adapted to be held in suitable slots in the rim of the wheel; second, in a tire having a central cavity and longitudinally slotted, each lip formed thereby having one-half of a headed projection, such as before described, projecting therefrom, the two halves when brought together and inserted in the slot in the rim holding the two lips close together; third, in a form of mouth-framing for the said slot in the tire, and, fourth, in the construction, combination, and arrangement of the several parts of which it is composed, as will be hereinafter more fully described and claimed.

Referring to the accompanying drawings, in which corresponding parts are designated by corresponding marks of reference, Figure 1 is a perspective view of a part of tire having my improved fastening device applied thereon. Fig. 2 is a transverse section thereof, the parts being assembled. Fig. 3 is a perspective view of a rim constructed in accordance with this invention. Fig. 4 is a longitudinal section of the assembled tire and rim shown in the foregoing figures. Fig. 5 is a perspective view of a slotted tire having my invention applied thereto. Fig. 6 is a perspective view showing my invention as applied to a tube-tire. Fig. 7 is a detail view of the mouth-frame shown in Fig. 6, it being detached from the tire. Fig. 8 is a transverse section taken through Fig. 6. Fig. 9 is a detail of the mouth-frame joint.

In Fig. 1 I have shown the most simple form of my invention. In the construction there shown the tire A has attached to the inner side thereof and projecting inwardly therefrom one or more T-shaped studs 1, the bases of the studs being fastened to the tire in any suitable manner—such, for instance, as by plates 2 on their bases vulcanized in the material of the tire—and as many of such studs may be used as desired. The rim B has a corresponding number of longitudinal slots 3 formed therein to permit the passage of the shanks 4 of the studs, one end of each slot terminating in and opening into a transverse slot 5, the two slots 3 and 5 thus in effect forming a single T-slot, and through each transverse slot 5 the head 6 of the corresponding stud 1 may be inserted to permit its shank being passed up the longitudinal slot 3 opening therefrom, this being simultaneously effected with all the studs by turning the tire upon the rim in the proper direction. To permit the passage of the heads of the studs, the body of the rim is undercut on each side of the longitudinal slots, and a convenient and satisfactory means and arrangement for this purpose is shown in Figs. 2, 3, and 4 in which I cut in the inner surface of the rim, a channel 7, of sufficient width to receive the head of the stud and slightly deeper than the thickness thereof and cover the same with a plate 8, of sheet metal, secured to the rim, the plate having the hereinbefore-described longitudinal and transverse slots formed therein. Each transverse slot is so disposed in relation to the intersecting longitudinal one as to cause the natural tendency of the tire to move upon the rim to carry the studs toward the closed ends of the longitudinal slots and thus prevent the loosening of the tire. Thus in Fig. 4, presuming that the wheel, of which the rim shown forms a part, is a driving-wheel moving in the direction of the arrow, it will be seen that the friction of the tire upon the ground will continually crowd the stud toward the closed end of the slot, while to prevent the accidental opposite movement of the parts, as in back-pedaling on a bicycle, the contacting surfaces of the head of the stud and of the plate may be knurled to prevent slipping in such direction. As an additional safeguard I may, and as is shown in dotted lines in Fig. 2, insert under the plate a transverse key 10, intersecting the open end of the longitudinal slot 3 and closing the open end of the said slot behind the stud and preventing the latter from coming out of the slot until the key is withdrawn.

As a preferred construction to accomplish the same object I may place a block 10' upon the inner surface of the tire, as shown in Fig. 1, and adapted when the tire is inflated to be within the open end of the slot 3, and to thus prevent the rearward motion of the stud therein. Such a block, while firmly held in place when the tire is inflated, will, when the tire is deflated, be capable of being readily lifted out of the slot if it be desired to disconnect the parts.

From the foregoing it will be seen that the tire is held upon the rim without the use of cement and therefore without the disadvantages accompanying such use; that the tire may be readily removed by turning it upon the rim until the studs are contained within the transverse slots in the rim, when they can be lifted out, and that the tire may be replaced by the reversal of these movements; that my invention as above described is applicable to securing any form of tire in place, and that wheels having it applied thereto may be employed generally and upon various classes of vehicles. It will also be seen that by curving the heads 6 of the studs and by giving a corresponding curvature to the plate (which should correspond to the groove formed in the rim to receive the tire) additional strength is given to the fastening against the tendency of the tire to come off when turning a corner.

When the above-described form of fastening is used in connection with pneumatic tires, I may form a longitudinal slot 11, extending entirely through the rim and through which the valve-stem 12 may project, the slot being of sufficient length to permit the free movement of the valve-stem therein when the tire is moved upon the rim in fastening the former in place.

In Fig. 5 I have shown my invention as applied to a rubber or similar tire A', having a central cavity and split upon its under surface. In this construction the edges formed by the split may be reinforced by a strand of wire 13, worked therein, or by thickening such edges themselves, and to each edge at opposite points is attached an L-shaped stud 1', the opposite studs when brought together forming a T-shaped stud, corresponding in all respects with the stud described in connection with Fig. 1 and intended for use in connection with a slotted rim of the character before described. It will be seen that when the opposite studs on the opposite edges of the tire are brought together and inserted in the slots in the rim such a tire will not only be held in place, but the edges thereof will be held together, thus dispensing with the use of lacings or other forms of fastening therefor, and thus adapting such a tire for use as the outer tube of a double-tube tire.

In Figs. 6, 7, 8, and 9 I have shown another feature of my invention. In these figures a longitudinal slot of convenient length is formed in the inner surface of the tube-tire A'', each of the two edges thus formed being secured to a bow 14, composed of two hinged bars 15 and 16, the corresponding bars of the opposite bows being hinged at the ends of the slot. These bars are of the same general construction as the bars forming the bows of a carriage-top—that is to say, the bars forming each bow have on their adjacent ends on each side of their pivotal points abutting shoulders 17 and 18, the former limiting their movement in opening and the latter in closing.

Upon each bow I secure an L-shaped stud 1', of the character before described, the studs upon the opposite bows being placed opposite each other.

In order to hold the bows together while the studs thereon are being inserted in the slots in the rim, I may attach the corresponding ends of one of the opposite bars of each bow to the opposite ends of a split elastic ring 19, which normally tends to close and thus to close the bows. When such a ring is used, it affords a convenient guard for the valve-stem of an inner tube $A^3$, contained within the tube A'' of the tire, as shown in Fig. 6.

It will be seen that the form of the invention shown in Figs. 6, 7, 8, and 9 lends itself for use with the so-called "double-tube" tires, and in Fig. 8 I have therefore shown an inner tube contained within the tube A''. In such case it may be well to secure to the inner surface of the tube A'', adjacent to the slit, a flap 20 of suitable material to protect the inner tube from contact with the various members of the mouth-frame.

Having thus described my invention, what I claim, and desire to secure by Letters Patent, is—

1. The combination with a rim provided with longitudinal slots therein having offsets at one end, of a tire having inwardly-projecting headed studs adapted to be engaged within the slots, and movable keys closing the ends of the slots behind the studs, substantially as described.

2. The combination with a rim having a groove therein, of a plate having a longitudinal slot and a closed transverse intersecting slot mounted over the groove, and an expansible tire having an inwardly-projecting headed stud adapted to be engaged in the longitudinal slot in the plate, substantially as described.

3. The combination with a rim having a groove therein, of a plate having longitudinal and transverse intersecting slots mounted over the groove, a tire having an inwardly-projecting headed stud adapted to be engaged in the longitudinal slot in the plate, and a key sliding beneath the said plate and behind the stud, substantially as described.

4. The combination with a rim having a groove therein, of a curved plate having longitudinal and transverse intersecting slots mounted over the groove, and a tire having a T-shaped stud projecting inwardly therefrom, the head of the stud being curved to correspond to the curvature of the plate, substantially as described.

5. The combination with a rim having a groove therein, of a curved plate having longitudinal and transverse intersecting slots mounted over the groove, and a tire having a T-shaped stud projecting inwardly therefrom, the head of the stud being curved to correspond to the curvature of the plate, the head of the stud and the plate being knurled to prevent slipping, substantially as described.

6. The combination with a rim having a groove therein, of a curved plate having a longitudinal slot and a closed transverse intersecting slot mounted over the groove, an expansible tire having a T-shaped stud projecting inwardly therefrom, the head of the stud being curved to correspond to the curvature of the plate, the head of the stud and plate being knurled to prevent slipping, and a key sliding beneath the plate and behind the stud, substantially as described.

7. The combination with a rim having a transverse and an undercut longitudinal slot therein, of a pneumatic tire having an inwardly-projecting headed stud thereon engaging in the longitudinal slot in the rim, the rim also having a second longitudinal slot, and a valve-stem inwardly projecting from the tire and through the last-named slot in the rim, substantially as described.

8. The combination with a tire having a central cavity and a slotted inner surface, of studs attached to the opposite edges formed by the slot at opposite points, the studs having oppositely-extended overhanging heads thereon, the opposite studs being adjacent and forming a single T-stud, substantially as described.

9. The combination with a tire having a central cavity, and a slotted inner surface, of studs attached to the opposite edges formed by the slot at opposite points, the studs having oppositely-extended overhanging heads thereon, and a rim having intersecting transverse and undercut longitudinal slots to receive the studs, each pair of opposite studs being contained in the same longitudinal slot and forming a single T-stud, substantially as described.

10. The combination with a tubular tire slotted on its inner surface, of a frame, consisting of a plurality of bars attached to the edges formed by the slot, and studs attached to the opposite members of the frame at opposite points, the studs having oppositely-extending overhanging heads thereon, the opposite studs being adjacent and forming a single T-stud, substantially as described.

11. The combination with a tubular tire slotted on its inner surface, of a frame, consisting of a plurality of bars attached to the edges formed by the slot, studs attached to the opposite members of the frame at opposite points, the studs having oppositely-extending overhanging heads thereon, and a flexible flap located within the central cavity of the tire adjacent to the frame, substantially as described.

12. The combination with a tubular tire slotted on its inner surface, of a frame, consisting of two bows, each consisting of two pivoted bars provided with abutting limiting-shoulders attached to the edges formed by the slot, and studs attached to the opposite members of the frame at opposite points, the studs having oppositely-extending overhanging heads, substantially as described.

13. The combination with a tubular tire slotted on its inner surface, of a frame, consisting of hinged pieces secured to the opposite edges formed by the slot, the corresponding ends of the opposite pieces being connected by a cut elastic ring, whereby they are held together, substantially as described.

14. The combination with a tubular tire slotted on its inner surface, of a frame, consisting of hinged pieces secured to the opposite edges formed by the slot, the corresponding ends of the opposite pieces being connected by a cut elastic ring, whereby they are held together, and studs upon the opposite pieces of the frame and at opposite points, having oppositely-extending overhanging heads, substantially as described.

15. The combination with a tubular tire slotted on its inner surface, of a frame, consisting of hinged pieces secured to the opposite edges formed by the slot, the corresponding ends of the opposite pieces being connected by a cut elastic ring, whereby they are held together, studs upon the opposite pieces of the frame at opposite points, having oppositely-extending overhanging heads, and an inner tube contained within the said tire and provided with a valve-stem projecting through the said ring, substantially as described.

16. The combination with a rim having a groove therein, of a plate having longitudinal and transverse intersecting slots mounted over the groove, an elastic tire having an inwardly-projecting headed stud adapted to be engaged in the longitudinal slot in the plate, and a projection upon the tire adapted to be seated in the longitudinal slot behind the stud to prevent the movement of the latter toward the intersecting transverse slot, substantially as described.

17. The combination with a rim having longitudinal and transverse intersecting slots therein, an elastic tire having an inwardly-projecting headed stud adapted to be engaged in the longitudinal slot in the rim, and a projection upon the tire adapted to be seated in the longitudinal slot behind the stud to prevent the movement of the latter toward the intersecting transverse slot, substantially as described.

18. The combination with a rim having longitudinal and transverse intersecting slots therein, a pneumatic tire having an inwardly-projecting headed stud adapted to be engaged in the longitudinal slot in the rim, and a projection upon the tire adapted to be held in the longitudinal slot behind the stud by the inflation of the tire to prevent the movement of the stud toward the intersecting transverse slot, and to be released therefrom upon the deflation of the tire, substantially as described.

In testimony whereof I affix my signature in presence of two witnesses.

WILLIAM E. BRUFFEY.

Witnesses:
H. G. HUNT,
J. P. DEAVER.